United States Patent
Won et al.

(10) Patent No.: US 8,406,165 B2
(45) Date of Patent: *Mar. 26, 2013

(54) MAGNETIC FIELD COMMUNICATION METHOD AND APPARATUS CAPABLE OF RECOGNIZING MULTIPLE NODES

(75) Inventors: Yun-Jae Won, Yongin-si (KR);
Seung-Ok Lim, Seongnam-si (KR);
Sun-Hee Kim, Seongnam-si (KR);
Kyu-Sung Hwang, Incheon (KR)

(73) Assignee: Korea Electronics Technology Institute, Seongnam (KR)

( * ) Notice: Subject to any disclaimer, the term of this patent is extended or adjusted under 35 U.S.C. 154(b) by 219 days.

This patent is subject to a terminal disclaimer.

(21) Appl. No.: 12/790,480

(22) Filed: May 28, 2010

(65) Prior Publication Data

US 2011/0243044 A1 Oct. 6, 2011

(30) Foreign Application Priority Data

Mar. 31, 2010 (KR) ........................ 10-2010-0029306

(51) Int. Cl.
*H04B 7/212* (2006.01)
*H04W 4/00* (2009.01)
*H04J 3/06* (2006.01)

(52) U.S. Cl. ......... 370/324; 370/338; 370/350; 370/503

(58) Field of Classification Search .................. 370/389, 370/392, 396–398, 400–401, 412–418, 427–429, 370/431–437, 442–475
See application file for complete search history.

(56) References Cited

U.S. PATENT DOCUMENTS 7,885,251 B2 * 2/2011 Kim et al. .................... 370/350
2007/0014268 A1 * 1/2007 Kim et al. .................... 370/338
2008/0181252 A1 * 7/2008 Rofougaran ................. 370/451
2008/0253328 A1 * 10/2008 Sahinoglu et al. ........... 370/330
2009/0238293 A1 * 9/2009 Bhatti et al. .................. 375/260

(Continued)

FOREIGN PATENT DOCUMENTS

EP 2373102 A1 * 10/2011
EP 2405588 A1 * 1/2012

(Continued)

OTHER PUBLICATIONS

Jeong et al., A Multi-hop Based Media Access Control Protocol Using Magnetic Fields in Wireless Sensor Networks, ICCSA 2011, Part IV, LNCS 6785, pp. 209-224.*

(Continued)

*Primary Examiner* — Tri H Phan
(74) *Attorney, Agent, or Firm* — Sughrue Mion, PLLC

(57) ABSTRACT

Magnetic field communication methods and apparatuses are performed by the coordinator and node of a magnetic field area network, respectively. The method which is performed by the coordinator includes: (a) sending a request packet requesting association with a network, disassociation from a network, network association state checking, data transmission, or group address setting, (b) receiving response packets, (c) selecting one or more response packets from among the received response packets, (d) sending a response acknowledgement packet to nodes corresponding to the selected response packets, (e) receiving response packets resent by nodes which have not received the sent response acknowledgement packet, (f) selecting one or more response packets from among the response packets received at (e), and (g) sending a response acknowledgement packet to nodes corresponding to the response packets selected at (f).

15 Claims, 11 Drawing Sheets

U.S. PATENT DOCUMENTS

| | | | |
|---|---|---|---|
| 2009/0289776 A1* | 11/2009 | Moore et al. | 340/10.41 |
| 2010/0134257 A1* | 6/2010 | Puleston et al. | 340/10.4 |
| 2011/0140969 A1* | 6/2011 | Ergen et al. | 342/458 |
| 2012/0002761 A1* | 1/2012 | Won et al. | 375/340 |

FOREIGN PATENT DOCUMENTS

| | | | |
|---|---|---|---|
| KR | 10-2005-0059304 A | 6/2005 | |
| KR | 10-2006-0115689 A | 11/2006 | |
| KR | 10-0682450 B1 | 2/2007 | |
| KR | 10-2009-0017234 A | 2/2009 | |
| KR | 10-2009-0124246 A | 12/2009 | |
| KR | 10-2010-0100031 A | 9/2010 | |
| WO | WO 2005015812 A1 * | 2/2005 | |

OTHER PUBLICATIONS

Korean Patent Office, Korean Notice of Allowance issued in corresponding KR Application No. 10-2010-0029306, dated Mar. 18, 2011.

Korean Patent Office, Korean Search Report issued in corresponding KR Application No. 10-2010-0029306, dated Jun. 15, 2012.

European Patent Office, European Search Report issued in corresponding EP Application No. 11160225.6, dated Jul. 29, 2011.

* cited by examiner

MAGNETIC FIELD COMMUNICATION METHOD AND APPARATUS CAPABLE OF RECOGNIZING MULTIPLE NODES

CROSS-REFERENCE TO RELATED APPLICATION(S)

This application claims the benefit under 35 U.S.C. §119 (a) of a Korean Patent Application No. 10-2010-0029306, filed on Mar. 31, 2010, in the Korean Intellectual Property Office, the entire disclosure of which is hereby incorporated herein by reference for all purposes.

BACKGROUND

1. Field

The following description relates generally to a magnetic field communication method capable of recognizing multiple nodes, and, more particularly, to a magnetic field communication method capable of recognizing multiple nodes, which enables wireless communication to be smoothly performed between a Magnetic Field Area Network Coordinator (MFAN-C) and Magnetic Field Area Network Nodes (MFAN-Ns).

2. Description of the Related Art

FIG. 1 is a diagram illustrating the principle by which electromagnetic waves are generated.

As is well known, when Alternating Current (AC) voltage is applied to an antenna (for example, a dipole antenna), an electric field is generated and AC current flows through the antenna, so that a magnetic field is generated. Here, as an electromagnetic field starts to separate from the antenna at a distance d ($\lambda$(wavelength)/$2\pi$), it is converted into electromagnetic wave and then propagates across space.

Here, the term "magnetic field" refers to an area ranging from an antenna to a distance of $\lambda/2\pi$. Communication performed in this area is referred to as magnetic field communication.

Unlike existing RFID technology and USN ubiquitous sensor network technology, magnetic field communication technology enables wireless communication to be performed near water, soil or metal. This magnetic field communication technology is a core technology which is capable of overcoming the limitations of existing wireless communication technology.

SUMMARY

In one general aspect, there is provided a magnetic field communication method, the method being performed by a coordinator of a magnetic field area network, the method comprising: (a) sending a request packet requesting at least one of: association with a network, disassociation from a network, network association state checking, data transmission, or group address setting; (b) receiving response packets from nodes which have received the request packet; (c) selecting one or more response packets from among the response packets received at (b); (d) sending a response acknowledgement packet to nodes corresponding to the response packets selected at (c); (e) receiving response packets resent by nodes which have not received the response acknowledgement packet sent at (d); (f) selecting one or more response packets from among the response packets received at (e); and (g) sending a response acknowledgement packet to nodes corresponding to the response packets selected at (f).

The method may further include: counting the number of times the request packet is sent; checking the count number if errors occur in the response packets selected at (c) or if a destination address of the response packets selected at (c) does not correspond to a node address of the coordinator; and resending the request packet if the checked count number is equal to or less than a predetermined value.

The method may include that (c) and (d) comprise selecting a plurality of response packets from among the response packets received at (b) and sending the response acknowledgement packet to a plurality of nodes of the magnetic field area network respectively.

The method may include that a temporal component of the magnetic field area network comprises a request interval in which the magnetic field communication network coordinator sends a request packet, a response interval in which the magnetic field communication network node sends a response packet, and an inactive interval which starts when no magnetic field communication network node has sent a response packet for a predetermined period of time.

In another general aspect, there is provided a magnetic field communication method, the method being performed by a node of a magnetic field area network, the method comprising:
(a) receiving a request packet from a coordinator of the magnetic field communication network;
(b) sending a response packet corresponding to the request packet received at (a), which is selected from among response packets for: association with a network, disassociation from a network, network association state checking, data transmission, and group address setting, to the coordinator; and
(c) resending the response packet if an acknowledgement packet has not been received from the coordinator, wherein (b) and (c) are performed in a response interval which is selected from among a request interval in which the coordinator sends a request packet, a response interval in which the node sends a response packet, and an inactive interval which starts when no node has sent a response packet for a predetermined period of time.

The method may further include counting the number of times the response packet is sent, wherein (c) comprises checking the count number if the acknowledgement packet has not been received from the coordinator, and resending the response packet if the checked count number is equal to or less than a predetermined value.

The method may include that the node can send data in the inactive interval without requiring reception of a request packet from the coordinator.

A computer-readable recording medium may store a program for executing the magnetic field communication method set forth in any of the above.

Other features and aspects will be apparent from the following detailed description, the drawings, and the claims.

Figure 1:
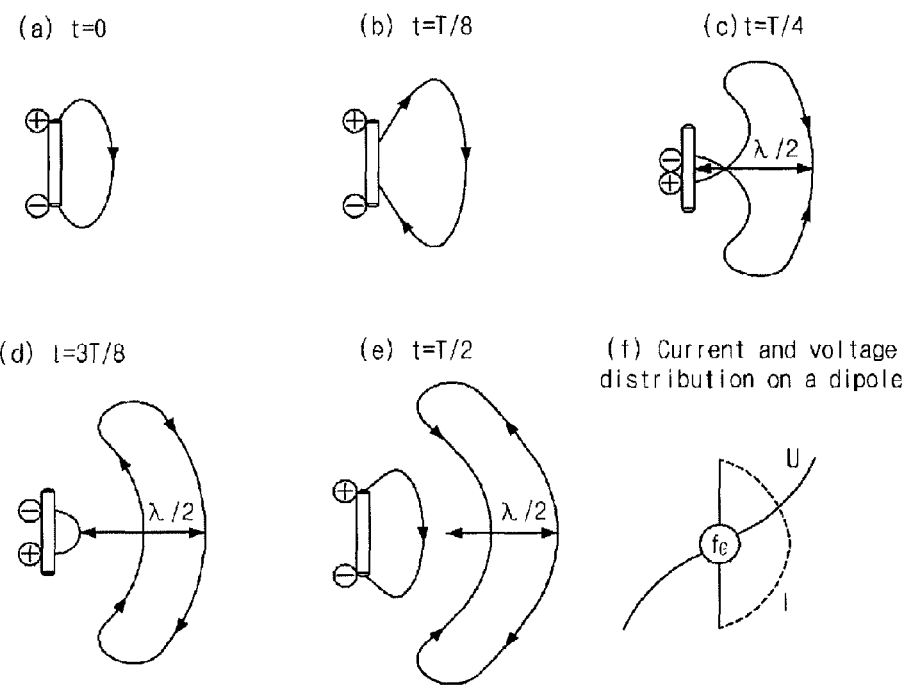
FIG. 1 is a diagram illustrating the principle by which electromagnetic waves are generated.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

1. Network Components

A Magnetic Field Area Network (MFAN) is a wireless network which is used to send and receive information using magnetic field signals via the low frequency band (30-300 KHz). The center operating frequency of wireless communication is 128 KHz, and the modulation method of wireless communication is Binary Phase Shift Keying (BPSK) or Amplitude Shift Keying (ASK). Manchester coding and Non-Return-to-Zero Level (NRZ-L) coding is used to diversify the data rate, providing a data rate of several Kbps over a distance of several meters. The devices which participate in a MFAN are divided into a MFAN-C and MFAN-Ns according to their roles. Only a single MFAN-C is present per MFAN, and a plurality of MFAN-Ns constitutes a network around the MFAN-C. The MFAN-C manages the association, disassociation and release of the MFAN-Ns. The MFAN uses Time Division Multiple Access (TDMA). The MFAN-C manages access to the MFAN. In the case of the access of a MFAN-N, time resources are assigned depending on the determination of the MFAN-C. MFAN technology may be used for sensor networks, home networks, and application service fields such as the construction, agriculture and transportation fields.

The principal components of a MFAN may be divided into a temporal component and a physical component. A temporal component refers to a superframe including a request interval, a response interval, and an inactive period, and the physical component refers to a network including a MFAN-C and MFAN-Ns. The fundamental element of the physical component is a node. Nodes may be divided into two types: a MFAN-C which manages a network, and MFAN-Ns which are elements of the network.

Figure 2:
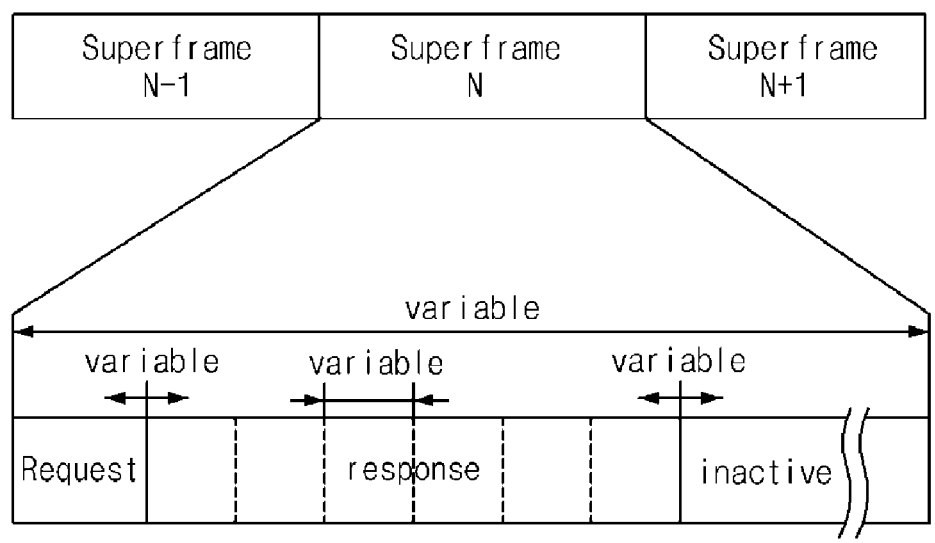
FIG. 2 is a diagram showing the structure of a superframe, that is, a temporal component.
Figure 3:
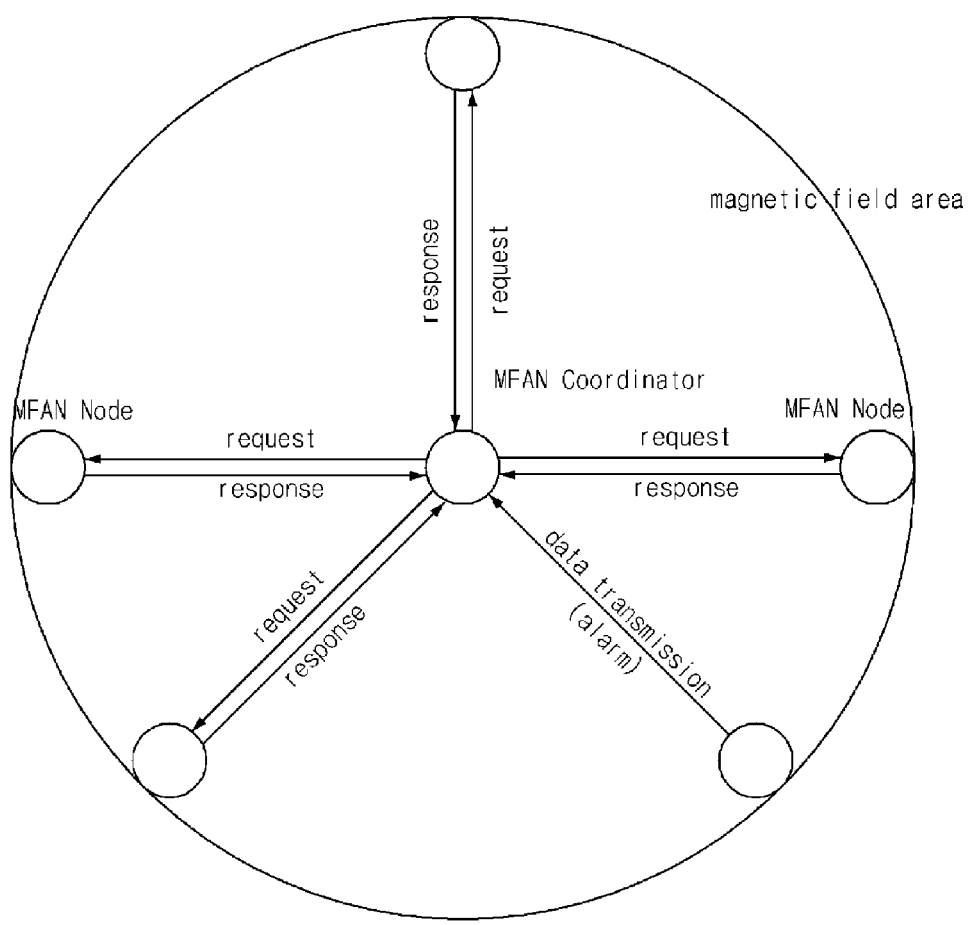
FIG. 3 shows the structure of a network, that is, a physical component.

FIG. 2 is a diagram showing the structure of a superframe, that is, a temporal component, and FIG. 3 shows the structure of a network, that is, a physical component. The node which may be determined first in a MFAN is a MFAN-C. When the MFAN-C sends a request packet in a request interval, a superframe of the MFAN may start. The MFAN-C may function to manage the association, disassociation, and release of MFAN-Ns within a communication area, and may manage transmission and reception sections. Since a MFAN can use a single channel in a communication area, a single network may be present therein. The nodes other than the MFAN-C in the MFAN may be MFAN-Ns. The MFAN-C and each of the MFAN-Ns may be connected to each other in a 1:1 correspondence. Although nodes which participate in a MFAN are divided into a MFAN-C and MFAN-Ns according to their roles, each of the nodes may function as a MFAN-C or a MFAN-N.

A temporal component which can be used in a MFAN may be time slots in TDMA. The MFAN-C may manage a group of MFAN-Ns which may transmit data in a response interval. Time slots may be autonomously managed by the MFAN-Ns of a selected group within a MFAN. The structure of a MFAN superframe is shown in FIG. 2, and may include a request interval, a response interval, and an inactive interval. The lengths of the request and response intervals may be variable. A superframe may start when the MFAN-C sends a response request packet in the request interval. A response request packet may include information about MFAN-Ns which can send response packets in the response interval. The MFAN-Ns may send response packets in the response interval using the information included in the response request packet.

The request interval is an interval in which the MFAN-C sends a response request frame including information about MFAN-Ns which send response frames in the response interval.

The response interval is an interval in which the MFAN-Ns can send response frames in response to the request from the MFAN-C. The response interval may be divided into a plurality of time slots according to the number of MFAN-Ns within the MFAN. The length of each time slot may be variable depending on the length of the response frame and the length of the acknowledgement frame. Slot numbers may be determined by the sequence of time slots, and a MFAN-N which will perform sending in each time slot is allocated by the MFAN-C. The MFAN-C may allocate the response interval to a specific group so that that specific group uses the response interval, and the nodes of the group may autonomously send data frames using the response interval.

The inactive interval may start when no node has sent a response packet for a certain period of time, and denotes the interval in which nodes can send data even when the MFAN-C has made no request. This interval may last until the MFAN-C sends a request packet.

The superframe of the MFAN may be divided into the request interval, the response interval and the inactive interval, and the MFAN-C and the MFAN-Ns, that is, the components of the MFAN, operate in these intervals, as described below.

In the request interval, the MFAN-C may broadcast a response request packet to all of the nodes. The MFAN-Ns which have received the response request packet may determine whether to send response packets in the response interval depending on the response request packet. The MFAN-C may determine a group of MFAN-Ns which will send response packets in the response interval.

In the response interval, the MFAN-Ns selected by the MFAN-C can send response packets. When a MFAN-N sends a response packet in the response interval, the MFAN-C which has received the response packet may send a response acknowledgement packet. A MFAN-N which has not received a response acknowledgement packet may repeatedly send a response packet in every time slot of the response interval until it receives a response acknowledgement packet from the MFAN-C.

When any MFAN-N has not sent a response packet for a specific period of time, an inactive interval may start and may last until the MFAN-C sends a request packet. In one example, in the inactive interval, the MFAN-Ns can send data without requiring a request from the MFAN-C.

The physical components of the MFAN are nodes, including a MFAN-C and MFAN-Ns, in a star topology network. A MFAN is a network which enables the MFAN-C and the MFAN-Ns around the MFAN-C to send data. The basic components of the MFAN are the nodes. Nodes are divided into a MFAN-C and MFAN-Ns according to their roles. The MFAN-C may manage the entire MFAN. A single MFAN-C may be present in a single network. The MFAN-C may control all of the MFAN-Ns by broadcasting a response request packet to all of the MFAN-Ns at the same time. The MFAN-Ns may transmit and receive response packets under the control of the MFAN-C. A MFAN may be configured as shown in FIG. 3.

The MFAN-C may be the node which manages the MFAN. A single MFAN-C may be present in a single network. The MFAN-C may manage and control the MFAN-Ns using a response request packet.

The MFAN-Ns may be all the nodes of the MFAN which are not the MFAN-C. For example, a maximum of 65,519 MFAN-Ns may be present per network. The MFAN-Ns may send response packets in response to the request packet transmitted by the MFAN-C.

In order to identify the MFAN-Ns, the MFAN may use an address system including a MFAN ID, a UID, a group address, and a node address.

A MFAN ID is a unique ID which identifies a MFAN. The value of the MFAN ID may be a unique value which is different from other MFAN IDs, and may last as long as the MFAN lasts.

A UID is a unique identifier including 64 bits, and may include a group address, an IC manufacturer code, and an IC manufacturer sequence number, as shown in Table 1. A MFAN-N may be identified using a UID.

TABLE 1

| Unit: bytes | | |
|---|---|---|
| 1 | 1 | 6 |
| Group address | IC manufacturer code | IC manufacturer serial No. |

A group address is the identifier of a group of selected MFAN-Ns, and may be used in methods for minimizing collisions because the group address may enable a request for the transmission of data to be made on a group basis when packets are transmitted. The value of a group address may be in the range of 0x00 to 0x2F. The group addresses reserved for the MFAN are shown in the following Table 2:

TABLE 2

| Group address | Description | Remark |
|---|---|---|
| 0xFF | for all groups | in the case of selecting all groups |
| 0xF0-0xFE | reserved | |

A node address is an identifier which is used to identify each node in lieu of a UID, and is a 16-bit address which is allocated by the MFAN-C when a MFAN-N associates with a network. The node addresses reserved for the MFAN are listed in the following Table 3:

TABLE 3

| Node address | Description | Remark |
|---|---|---|
| 0xFFFF | for all nodes | in the case of broadcasting, or in the case of sending data to all nodes |
| 0xFFFE | for a node which has not been associated | initial node address of a node |
| 0xFFF0-0xFFFD | reserved | |

2. Summary of Network States

In a MFAN, MFAN-Ns may presume the operating states related to the setting up of a network, association with a network, response transmission, data transmission, disassociation from a network, and the release of a network.

A MFAN-C may form a network by sending a request packet to MFAN-Ns in a request interval. Where a MFAN ID is included in the request packet, a network which will be accessed by a MFAN-N may be identified. The minimum network interval refers to an interval in which only a MFAN-C is present, and may include a request interval and an inactive interval.

When the MFAN-C sends an association request packet in the request interval, a MFAN-N which desires to associate with the MFAN may check the received packet, and, if the received packet is a packet requesting association with the desired MFAN, may send an association response packet in a response interval to associate with the corresponding MFAN. The MFAN-C which has received the association response packet may send an association response acknowledgement packet to the corresponding MFAN-N. The MFAN-N which has received the association response acknowledgement packet from the MFAN-C has associated with the network.

A MFAN-N which has associated with a MFAN may be disassociated from the network in response to a request from the MFAN-C or voluntarily. The MFAN-C may forcibly disassociate the MFAN-N from the network depending on the current network status or a service method by sending a disassociation request to the MFAN-N. When the MFAN-N voluntarily disassociates from the network, the MFAN-C can be aware of the disassociation of the MFAN-N based on the results of the association request response of the MFAN-C.

In the MFAN, when the MFAN-C sends a data response request packet in the request interval, the MFAN-Ns can send data response packets to the MFAN-C according to the type of requested data. The MFAN-C which has received the data response packet may send a data acknowledgement packet, and a MFAN-N which has received a data acknowledgement packet may complete the transmission of the data.

The release of a MFAN may be divided into a normal release which is performed in response to a request from a MFAN-N and an abnormal release which occurs due to a situation arising by accident. A normal release refers to the release of a network which is performed in such a way that the MFAN-C determines whether to release the network and then requests the network to be released from all MFAN-Ns. An abnormal release refers to the release of a network which occurs when the power to all MFAN-Ns associated with the network is turned off at the same time or when all MFAN-Ns exit from the communication area of the MFAN at the same time.

The states of MFAN devices may be divided into the states of the MFAN-C and the states of the MFAN-Ns. The states of the MFAN-C may include a standby state, a packet analysis state, and a packet generation state. The states of the MFAN-Ns may include a hibernation state, an activation state, a standby state, a packet analysis state, and a packet generation state.

Figure 4:
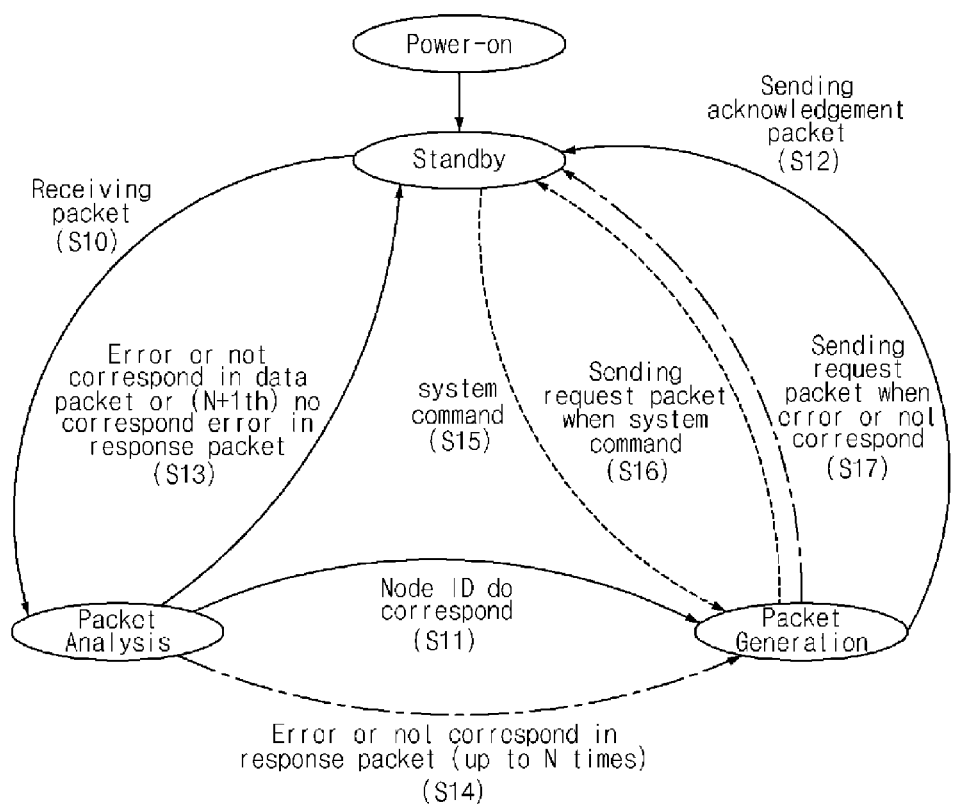
FIG. 4 is a state transition diagram of a MFAN-C.

FIG. 4 is a state transition diagram of a MFAN-C. As shown in FIG. 4, when the MFAN-C receives a packet from a MFAN-N while detecting a carrier in a standby state, the MFAN-C may transition to a packet analysis state at S10. If the node ID of the MFAN-C corresponds to the destination address of the received data packet, the MFAN-C may transition to a packet generation state at S11, create a Data receiving Acknowledgement (DA) packet, and then send the DA packet to the MFAN-N. Thereafter, the MFAN-C may return to a standby state S12.

Concurrently, if the node ID of the MFAN-C does not correspond to the destination address of the received data packet or an error occurs in the data packet in the packet analysis state, the MFAN-C may immediately return to a standby state at S13. If an error occurs in the received response packet or the node ID of the MFAN-C does not correspond to the destination address of the received response packet in the packet analysis state, the MFAN-C may re-generate an SQ (Response Request) packet and may resend the SQ packet to the MFAN-Ns in the packet generation state. When such an error occurs repeatedly, the resending may be repeated a maximum number of N times desired by the procedure of the packet analysis state, for example, three times, at S14. When the procedure reaches (N+1) times, the MFAN-C may determine that further repetition of the resending of the SQ packet is meaningless, and may return from the packet analysis state to the standby state in order to reduce power consumption at S13.

Concurrently, when the MFAN-C receives a system command from a higher system, the MFAN-C may transition from the standby state to the packet generation state and then may send a corresponding request packet at S15, and may return to the standby state at S16. If an error occurs in the system command or the node ID of the MFAN-C does not correspond to the destination address of the received system command in the above state, the MFAN-C may send an SQ packet and return to the standby state at S17.

Figure 5:
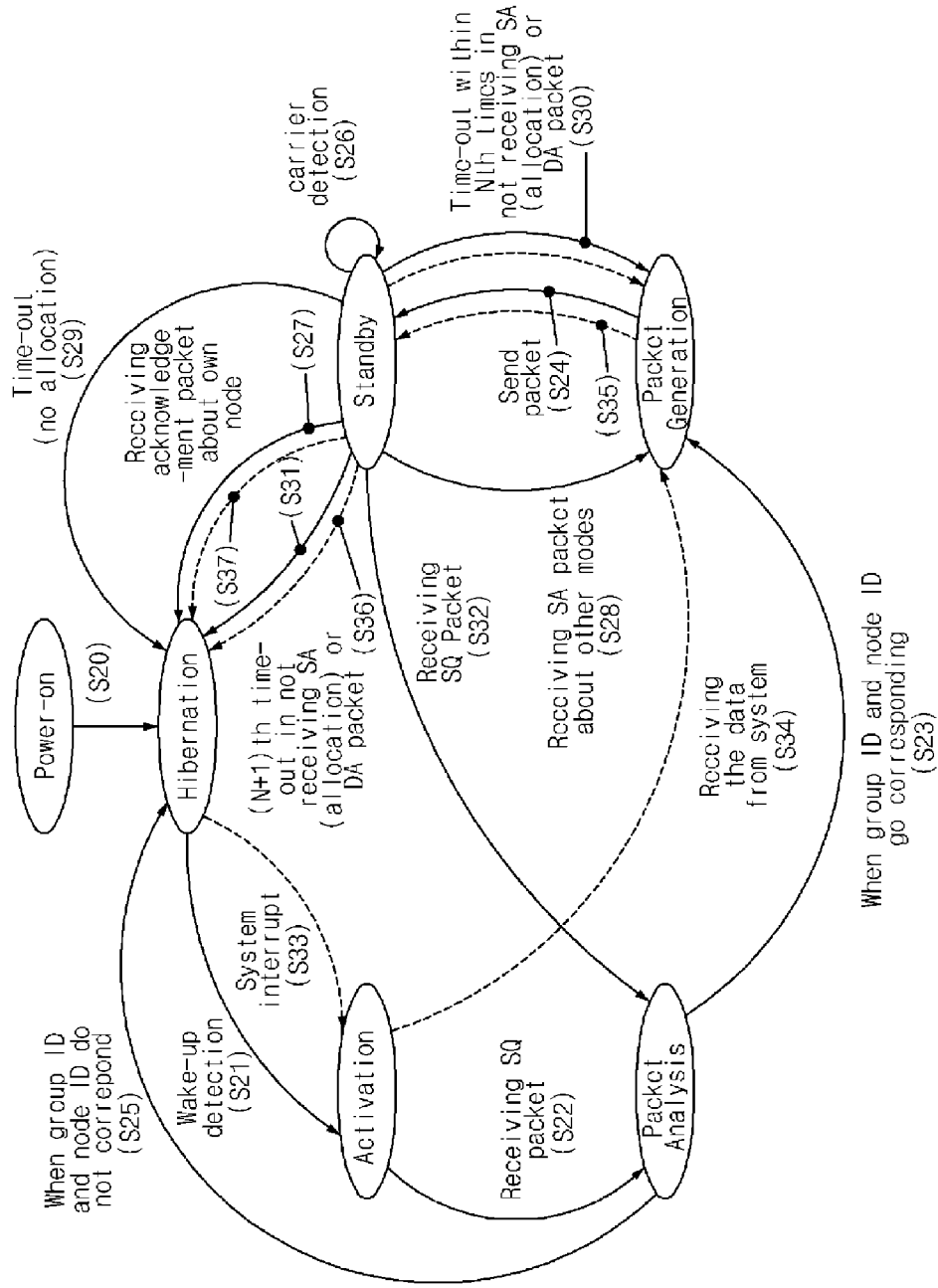
FIG. 5 is a state transition diagram of a MFAN-N.

FIG. 5 is a state transition diagram of a MFAN-N. As shown in FIG. 5, all MFAN-Ns may continuously check a carrier. When power is turned on, a MFAN-N may enter a hibernation state at S20. If a wake-up signal (bit stream) is detected in this state, the MFAN-N may transition to an activation state at S21. If an SQ packet is received in this state, the MFAN-N enters a packet analysis state and then analyzes the received SQ packet.

If the destination address of the SQ packet corresponds to the group and node IDs of the MFAN-N, the MFAN-N may transition to a packet generation state and then may send a response packet to the MFAN-C at S23 and transition to a standby state at S24. In contrast, if the destination address of the SQ packet does not correspond to the group and node IDs of the MFAN-N, the MFAN-N may immediately return to the hibernation state at S25. If the MFAN-N receives an SA (response acknowledgement) packet related to its own node while detecting a carrier in the standby state at S26, the MFAN-N may return to the hibernation state at S27. In contrast, if an SA packet related to another node is received, the MFAN-N may transition to the packet generation state at S28.

If a slot number has not been allocated and a time-out period has elapsed in the standby state, the MFAN-N may immediately return to the hibernation state at S29. In contrast, if a slot number has been allocated, the MFAN-N may transition to the packet generation state and then may generate a response packet at S30 until the number of times the time-out period has elapsed successively reaches a maximum of N. If a slot number has been allocated and the number of times the time-out period has elapsed reaches (N+1) in the standby state, the MFAN-N may determine that further repeated generation of a response packet is meaningless and returns to the hibernation state so as to reduce power consumption at S31. If the MFAN-N receives an SQ packet while detecting a carrier in the standby state, the MFAN-N may transition to the packet analysis state at S32.

Also, when a system interrupt occurs, the MFAN-N may transition from the hibernation state to the activation state at S33. In one example, if the MFAN-N receives data from a system, the MFAN-N may move to the packet generation state, generate a data packet and then sends the data packet to the MFAN-C at S34, and then transition from the packet generation state to the standby state at S35. If a DA packet is received in this state, the MFAN-N may return to the hibernation state at S36.

If a DA packet has not been received for a time-out period, the MFAN-N may regenerate a data packet and then sends the data packet to the MFAN-C, and may enter the standby state form the packet generation state at S37. If the case where a DA packet has not been received for a time-out period occurs successively, the procedure of the packet generation state may be repeated a maximum number of times (e.g., N) desired by the procedure, for example, three times. When the procedure reaches (N+1) times, the MFAN-N may return from the standby state to the hibernation state at S38.

3. Media Access Control Frame Format

The media access control frame of the MFAN may include a frame header and a frame body, as shown in Table 4. The frame header is information which is used for the exchange of data between MFAN-Ns, and the frame body is data which is actually exchanged between MFAN devices.

3.1 Frame Format

A frame header may include control-related information, including a MFAN ID, frame control information, a transmission/reception node address, and a frame sequence number, which are necessary for the exchange of data between MFAN-Ns. The type of frame and also the nodes which are exchanging the frame may be identified using information located therein. Furthermore, the reliability of the frame may be increased by detecting the error of the exchanged frame using the above information.

A frame body may include payload which is data which is actually exchanged between MFAN devices and a Frame Check Sequence (FCS) which is used to check the error of the payload.

TABLE 4

Unit: bytes

| 1 | 2 | 2 | 2 | 1 | Variable | 2 |
|---|---|---|---|---|----------|---|
| MFAN ID | frame control | source address | destination address | sequence number | payload | FCS |
| | | frame header | | | frame body | |

The frame header may include information about the transmission and reception of a frame and flow control.

The MFAN ID field may be 1 byte long, as shown in Table 4, and may be used to identify a network.

Frame control elements may include sub-fields, including frame type, acknowledgement policy, the first fragment, the last fragment and a protocol version. The format of the frame control elements is shown in the following Table 5:

TABLE 5

Unit: bits

| 0-2 | 3-4 | 5 | 6 | 7-8 | 9-15 |
|---|---|---|---|---|---|
| frame type | acknowledgement policy | first fragment | last fragment | protocol version | reserved |

The fields of Table 5 will be described, as follows:

1) The frame type field may be 3 bits long (refer to Table 6).
2) The acknowledgement policy field may be 2 bits long. The acknowledgement policy field of an acknowledgement frame indicates the type of its own acknowledgement frame, and the acknowledgement policy field of some other frame indicates an acknowledgement policy which is used by a receiving node with respect to the corresponding frame.

Acknowledgement policies will be described, as follows:
(a) No acknowledgement: A receiving node does not acknowledge a transmitted packet, and a transmitting node considers transmission to be successful regardless of the actual results. This policy is used for a frame which is transmitted in a 1:1 or 1:N relationship which does not require acknowledgement.
(b) Single acknowledgement: A node which has received a corresponding response packet responds to a transmitting node by sending a response acknowledgement packet after the Short Interframe Space (SIFS). This acknowledgement policy may be used for a frame which is sent in a 1:1 relationship.
(c) Multiple response acknowledgement: A node which has received a corresponding response packet responds to a plurality of transmitting nodes by sending a response acknowledgement packet to the transmitting nodes after the SIFS. This acknowledgement policy can be used for a frame which is sent in a 1:N relationship.
(d) Data acknowledgement: A node which has received a corresponding data frame responds to a transmitting node by sending a data acknowledgement packet after the SIFS. This acknowledgement policy may be used for a frame which is send in a 1:1 policy.

3) The first fragment field may be 1 bit long. With regard to this field, '1' indicates that a corresponding frame is the start of data from a higher layer, and '0' indicates that a corresponding frame is not the start of the data.

4) The last fragment field may be 1 bit long. With regard to this field, '1' indicates that a corresponding frame is the last of data from a higher layer, and '0' indicates that a corresponding frame is not the last of the data.

5) The protocol version field may be 2 bits long. The size and location of the protocol version field are constant regardless of the specification and version of the system. The example current value is "0", and may increase by one whenever a new version is released. When a specific node receives a packet of a higher version, it may discard the packet without notifying a transmitting node of the fact.

6) The reserved field is a field which may be reserved for later use.

The sequence number field may be 8 bits long, and may indicate the sequence number of a corresponding frame. In a frame, sequence numbers ranging from 0 to 255 may be sequentially given by a counter allocated for each packet. When the sequence number exceeds 255, the sequence number may start at 0 again.

The frame body may have a variable length, and may include the payload and a Frame Check Sequence (FCS). The payload may have a format varying according to the frame type sub-field within the frame control field, and the FCS may be used to check a frame for errors.

The payload is the data actually exchanged between the MFAN-C and the MFAN-Ns. The length of the payload may have a value which varies between 0 and 247.

The FCS may be 16 bits long, and may be used to check whether a frame body has been received without error. The FCS may be generated using the following standard generator polynomial of degree 16:

$$G(x) = x^{16} + x^{12} + x^5 + 1$$

3.2 Frame Types

Frame types are defined as a total of four types of frames, including a request frame, a response frame, a data frame and an acknowledgement frame, as shown in the following Table 6:

TABLE 6

Unit: bits

| Frame type | Value | Description | Interval |
|---|---|---|---|
| request frame | 0x0 | request for association and disassociation and data response from the MFAN-C | request |
| response frame | 0x1 | response to request for association and disassociation and data response from MFAN-C | response |
| data frame | 0x2 | used when a MFAN-N sends data without a request | inactive |
| acknowledgement frame | 0x3 | response from the MFAN-C and notification of reception of effective data packet | response, inactive |

The request frame may be used when the MFAN-C sends a request packet to a specific MFAN-N within the MFAN in the request interval or broadcasts information to all MFAN-Ns. The format of the request frame is shown in Table 7. The acknowledgement policy which is used when the request frame is broadcast is No Acknowledgement.

TABLE 7

Unit: bytes

| 8 | 1 | 1 | 1 | $L_1$ | $L_2$ | ... | $L_n$ | 2 |
|---|---|---|---|---|---|---|---|---|
| frame header | group address | request code | length (=$\Sigma L_n$) | request block-1 | request block-2 | ... | request block-n | FCS |
| | | | | request frame payload frame body | | | | |

The response frame may be used when the MFAN-N sends a response packet for a request from the MFAN-C in the response interval. The corresponding MFAN-N may send a response packet a specific or smaller number of times in the response interval until it receives an acknowledgement packet. The format of the response frame is shown in the following Table 8:

TABLE 8

Unit: bytes

| 8 | 1 | 1 | 1 | $L_1$ | $L_2$ | ... | $L_n$ | 2 |
|---|---|---|---|---|---|---|---|---|
| frame header | group address | response code | length (=$\Sigma L_n$) | response block-1 | response block-2 | ... | response block-n | FCS |
| | | | | response frame payload frame body | | | | |

The data frame may be used when the MFAN-N sends data to the MFAN-C in the inactive interval without requiring a request from the MFAN-C, as shown in the following Table 9:

TABLE 9

Unit: bytes

| 8 | 8 | L | 2 |
|---|---|---|---|
| frame header | UID | data | FCS |
| | | data frame payload frame body | |

Acknowledgement frames may be divided into two types: response acknowledgement frames and data acknowledgement frames.

With regard to a response acknowledgement frame, when the MFAN-C sends a request frame, the MFAN-N which has received the request packet may send a response packet and the MFAN-C which has received the response packet may send the response acknowledgement packet. The format of the response acknowledgement frame is shown in Table 10. Response acknowledgement data about a received response packet may be recorded in the payload of the acknowledgement frame. The MFAN-C which has received the corresponding response frame may respond to the transmitting MFAN-N by sending a response acknowledgement frame after the SIFS in the response interval.

TABLE 10

Unit: bytes

| 8 | 1 | 1 | 1 | $L_1$ | $L_2$ | ... | $L_n$ | 2 |
|---|---|---|---|---|---|---|---|---|
| frame header | group address | response ACK code | length (=$\Sigma L_n$) | response ACK block-1 | response ACK block-2 | ... | response ACK block-n | FCS |
| | | | | response ACK frame payload frame body | | | | |

The data acknowledgement frame is an acknowledgement frame for a received data packet. The MFAN-C may respond to the MFAN-N which has received the data packet by sending a data acknowledgement frame after the SIFS in the inactive interval. The data acknowledgement frame may include a frame header and a frame check sequence without payload, as shown in Table 11. However, if the address of a receiving node is 0xFFFE (a node which does not associate with a network), a UID field may be included in the data acknowledgement frame.

TABLE 11

Unit: bytes

| 1 | 2 | 2 | 2 | 1 | 8 (option) | 2 |
|---|---|---|---|---|---|---|
| MFAN ID | frame control | source address | destination address | sequence number | UID | FCS |
| | | frame header | | | frame body | |

3.3 Payload Format

The format of the payload may vary according to the type of frame, such as a request frame, a response frame, a data frame, or a response acknowledgement frame.

3.3.1 Request Frame

The format of the payload of a request frame may include a group address, a request code, a length, and one or more request blocks, as shown in Table 12. If the group address is 0xFF, responses may be requested from all the MFAN-Ns of a group.

TABLE 12

Unit: bytes

| 1 | 1 | 1 | $L_1$ | $L_2$ | ... | $L_n$ |
|---|---|---|---|---|---|---|
| group address | request code | length | request block-1 | request block-2 | ... | request block-n |

The group address field may be 1 byte long, and may be used to request a response from a specific group.

The request codes used in the payload of a request frame are listed in the following Table 13:

TABLE 13

| Class | Request code | Description | Remark |
|---|---|---|---|
| Network | 0x01 | association request | request association response from non-associated node |
| | 0x02 | disassociation request | request disassociation response from associated node |
| | 0x03 | association state request | request association state response from associated node |
| | 0x04-0x0F | reserved | |
| Data | 0x11 | data request | request data transmission from associated node |
| | 0x12-0x1F | reserved | |
| Setting | 0x21 | group address setting | change group address of non-associated MFAN-Ns |
| | 0x22-0x2F | reserved | |
| Reserved | 0x31-0xFF | reserved | |

The length field may be 1 byte long, and may indicate the sum of the lengths of request blocks. The value of the length field may vary according to the length and number of request blocks.

The data format of the request block may vary according to the command to be requested. One or more request blocks may be included in the payload of the request frame.

The data format of each request block will be described, as follows:

1) Association Request

The data format of the association request may include an 8-byte UID mask (refer to Table 14). This UID mask may be used for the implementation of a binary search algorithm.

TABLE 14

| 8 |
|---|
| UID mask |

2) Disassociation Request

The data format of the disassociation request may include a 2-byte node address and a 1-byte slot number (Table 15). The first 2 bytes may correspond to the node address of a MFAN-N which will make a disassociation request, and the next 1 byte may correspond to a slot number of the response interval. For example, if the node address is 0xFFFF, disassociation responses may be requested from all MFAN-Ns corresponding to the group address.

TABLE 15

| 2 | 1 |
|---|---|
| node address | slot number |

3) Association State Request

The data format of the association state request is shown in Table 16. The first 2 bytes may correspond to the node address of a MFAN-N which will make an association state request. For example, if the node address is 0xFFFF, association state responses may be requested from all MFAN-Ns corresponding to the group address.

TABLE 16

| 2 | 1 |
|---|---|
| node address | slot number |

4) Data Request

The data format of the data request is shown in Table 17. The first 2 bytes correspond to a node address, the next 1 byte corresponds to a slot number, and the next 1 byte corresponds to the type of data to be received. The slot number indicates a time sequence of the divided response interval, and the data type is defined and used by a user according to an application product

TABLE 17

| 2 | 1 | 1 |
|---|---|---|
| node address | slot number | data type |

The data format of the group address setting request is shown in Table 18. The first 2 bytes may correspond to a node address, the next 1 byte may correspond to a slot number, and the next 1 byte may correspond to a group address to be set.

TABLE 18

| Unit: bytes | | |
|---|---|---|
| 2 | 1 | 1 |
| node address | slot number | group address |

3.3.2 Response Frame

The payload of the response frame may include response data for a request. The payload of the response frame is shown in Table 19. The first 1 byte may corresponds to a group address, the next 1 byte may correspond to a response code, the next 1 byte may correspond to the length (L) of the response data, and the next L bytes may correspond to the response data.

TABLE 19

| Unit: bytes | | | | | | |
|---|---|---|---|---|---|---|
| 1 | 1 | 1 | $L_1$ | $L_2$ | ... | $L_n$ |
| group address | response code | length | response block-1 | response block-2 | ... | response block-n |

The group address field may be 1 byte long, and may be used when responses are requested from a specific group.

The types of response codes are listed in the following Table 20:

TABLE 20

| Class | Request code | Description | Remark |
|---|---|---|---|
| Network | 0x01 | association request | Send UID of MFAN-N |
| | 0x02 | disassociation request | Send UID of MFAN-N |
| | 0x03 | association state request | send node address of MFAN-N |
| | 0x04-0x0F | reserved | |
| Data | 0x11 | data request | send requested data |
| | 0x12-0x1F | reserved | |
| Setting | 0x21 | group address setting | send UID and group address after changing group address |
| | 0x22-0x2F | reserved | |
| Reserved | 0x31-0xFF | reserved | |

The length field may be 1 byte long, and may indicate the length of response data. The length of response data may vary according to the type of response data.

The types of response data may be divided into an association response, a disassociation response, an association state response, a data response, and a group address setting response. The data format thereof will be described as follows:

1) Association Response

The data format of the association response is shown in Table 21. The data format of the association response may include an 8-byte UID.

TABLE 21

| 8 |
|---|
| UID |

2) Disassociation Response

The data format of the disassociation response is shown in Table 22. The data format of the disassociation response may include an 8-byte UID.

TABLE 22

| 8 |
|---|
| UID |

3) Association State Response

The data format of the association state response is shown in Table 23. The data format of the association state response may include an 8-byte UID and a 1-byte status value.

TABLE 23

| 8 | 1 |
|---|---|
| UID | status value |

Status values are shown in the following Table 24:

TABLE 24

| value | Description |
|---|---|
| 0x00 | disassociation status |
| 0x01 | association status |
| 0x02-0xFF | reserved |

4) Data Response

The data format of the data response is shown in Table 25. The data format of the data response may include L-byte requested data.

TABLE 25

| L |
|---|
| requested data |

5) Group Address Setting Response

The data format of the group address setting response is shown in Table 26. The data format of the group address setting response may include an 8-byte UID to which a changed group address has been applied and a 1-byte set group address.

TABLE 26

| 8 | 1 |
|---|---|
| UID | set group address |

3.3.3 Data Frame

The payload of the data frame may include data to be sent. The payload of the data frame may include an 8-byte UID and L-byte data (refer to Table 27).

TABLE 27

| 8 | L |
|---|---|
| UID | Data |

3.3.4 Response Acknowledgement Frame

The payload of the response acknowledgement frame may include data about a received response packet. The block format of the response acknowledgement frame is shown in Table 28. The first 1 byte may correspond to a group address, the next 1 byte may correspond to a response acknowledgement code, the next 1 byte may correspond to length L, and the next L bytes may correspond to response acknowledgement data.

TABLE 28

Unit: bytes

| 1 | 1 | 1 | $L_1$ | $L_2$ | ... | $L_n$ |
|---|---|---|---|---|---|---|
| group address | response ACK code | length | response ACK block-1 | response ACK block-2 | ... | response ACK block-n |

The group address field of the payload of the response acknowledgement frame may be 1 byte long, and may be used when a response is requested from a specific group.

The response acknowledgement codes used in the payload of the response acknowledgement frame are listed in the following Table 29:

TABLE 29

| Class | Request code | Description | Remark |
|---|---|---|---|
| Network | 0x01 | association response ACK | send UID and allocated node address of MFAN-N |
| | 0x02 | disassociation response ACK | send UID and allocated node address of MFAN-N |
| | 0x03 | association state response ACK | send UID and allocated node address of MFAN-N |
| | 0x04-0x0F | reserved | |
| Data | 0x11 | data response ACK | acknowledge sending of data to associated node |
| | 0x12-0x1F | reserved | |
| Setting | 0x21 | group address setting response ACK | send UID and group address after changing group address |
| | 0x22-0x2F | reserved | |
| Reserved | 0x31-0xFF | reserved | |

The length field of the payload of the response acknowledgement frame may be 1 byte long, may indicate the length of response acknowledgement data, and may vary according to the type of response acknowledgement data.

The types of response acknowledgement data which are used in the payload of the response acknowledgement frame may include association response acknowledgement, disassociation response acknowledgement, association state response acknowledgement, data response acknowledgement, and setting response acknowledgement. The data format of the response acknowledgement is described below.

1) Association Response Acknowledgement

The data format of the association response acknowledgement is shown in Table 30. The first 8 bytes may correspond to a UID, and the next 2 bytes may correspond to an allocated node address. If the allocated node address is 0xFFFF, that is, the address of a disassociated node, this may mean that association has been rejected.

TABLE 30

| 8 | 2 |
|---|---|
| UID | allocated node address |

2) Disassociation Response Acknowledgement

The data format of the disassociation response acknowledgement is shown in Table 31. The first 8 bytes may correspond to a UID, and the next 2 bytes may correspond to a node address. If disassociation is not allowed, an original node address may be recorded as the node address. If disassociation is allowed, 0xFFFE, that is, an initial node address, may be recorded.

TABLE 31

| 8 | 2 |
|---|---|
| UID | node address |

3) Association State Response Acknowledgement

The data format of the association state response acknowledgement may include an 8-byte UID (refer to Table 32).

TABLE 32

| 8 |
|---|
| UID |

4) Data Response Acknowledgement

The data format of the data response acknowledgement is shown in Table 33. The data format of the data response acknowledgement may include a 2-byte node address and 1-byte "reserved."

TABLE 33

| 2 | 1 |
|---|---|
| node address | reserved |

5) Group Address Setting Response Acknowledgement

The data format of the group address setting response acknowledgement is shown in Table 34. The data format of the group address setting response acknowledgement may include an 8-byte UID and a 1-byte group address status value.

TABLE 34

| 8 | 1 |
|---|---|
| UID | status value |

Group address status values are listed in the following Table 35:

TABLE 35

| Value | Description |
|---|---|
| 0x00 | completion of change |
| 0x01 | Failure of change |
| 0x02-0xFF | reserved |

4. Media Access Control Function

In the media access control layer of a MFAN, association, disassociation, and association state acknowledgement procedures may be used to manage the network. The types of data transmission may include transmission in a response interval and transmission in an inactive interval. Furthermore, a group address setting function may be provided to manage MFAN-Ns in a group.

In order for a MFAN-N to communicate with a MFAN-C, the MFAN-N may associate with a MFAN. A MFAN-N may check whether a MFAN has been already set up first, and may associate with an existing MFAN if there is an existing MFAN, and may become a MFAN-C and then set up a new MFAN if there is no existing MFAN. Here, setting up the new MFAN implies the periodic transmission of a request packet. Alternatively, depending on the performance of a node itself, a MFAN-N may not set up a MFAN but may remain a MFAN-N, or a MFAN-N may become a MFAN-C and then set up a new MFAN regardless of the presence of an existing MFAN. In one example, if there is an existing MFAN, the setting up of the network may be given up because there is a single frequency channel.

Figure 6:
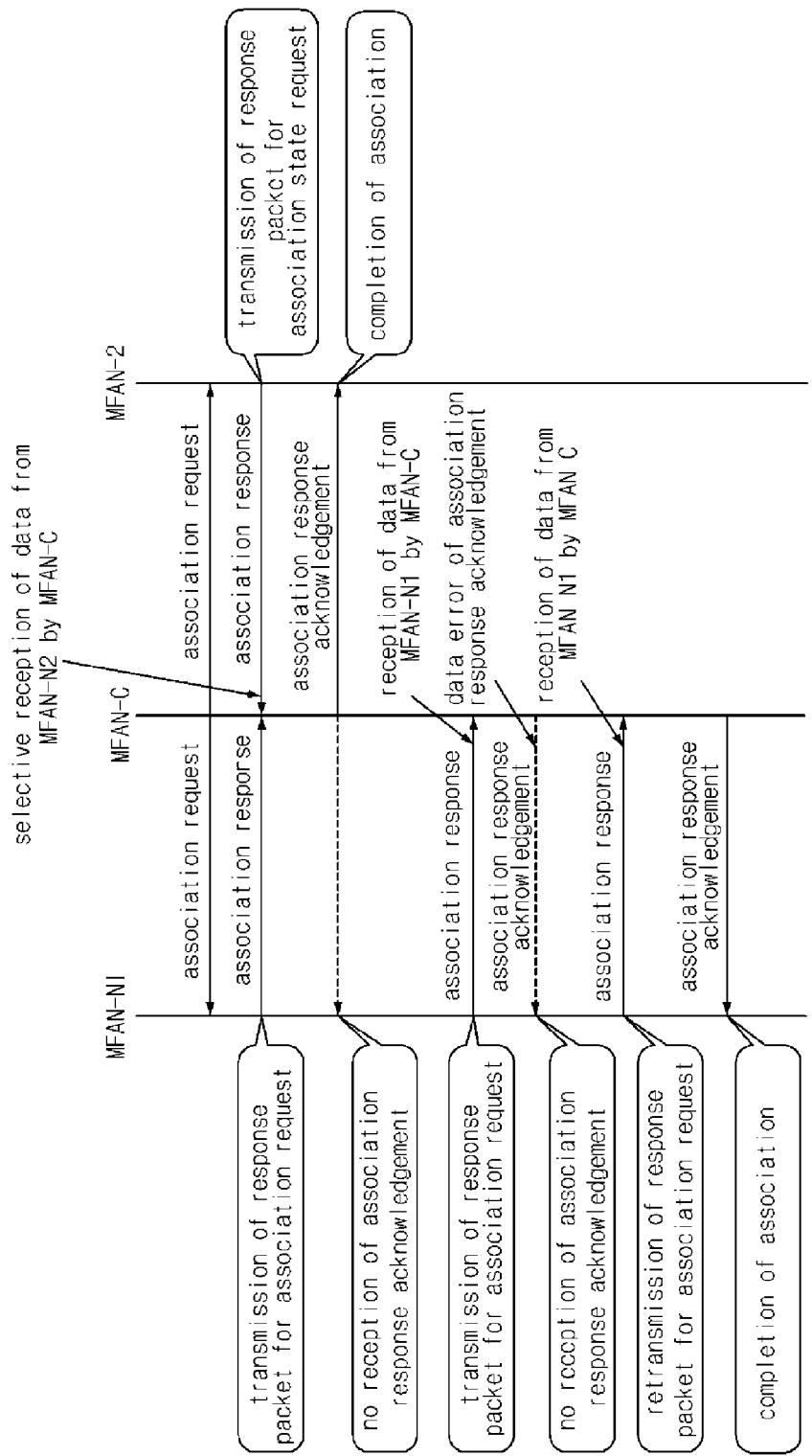
FIG. 6 is a flowchart illustrating an association procedure.

FIG. 6 is a flowchart illustrating an association procedure.

When a MFAN-C sends an association request packet to a MFAN-N which has not associated with a MFAN yet in a request interval, the MFAN-N may send an association response packet to the MFAN-C in a response interval. The MFAN-C may determine whether to associate the corresponding MFAN-N with the MFAN, and may provide notification of the results of the determination using an association response acknowledgement packet. If the association is allowed, an allocated node address may be included in the association response acknowledgement packet. In contrast, if the association is rejected, 0xFFFE, that is, an initial node address, may be recorded therein. As shown in FIG. 6, if the MFAN-C has not received an association response packet or if the MFAN-C has received an association response packet but an associating MFAN-N has not received an association response acknowledgement packet due to data errors in the association response acknowledgement packet, the MFAN-N may repeatedly send an association response packet for every superframe until the MFAN-N receives the association response acknowledgement packet. When the MFAN-N receives the association response acknowledgement packet from the MFAN-C, the association may be completed.

Figure 7:
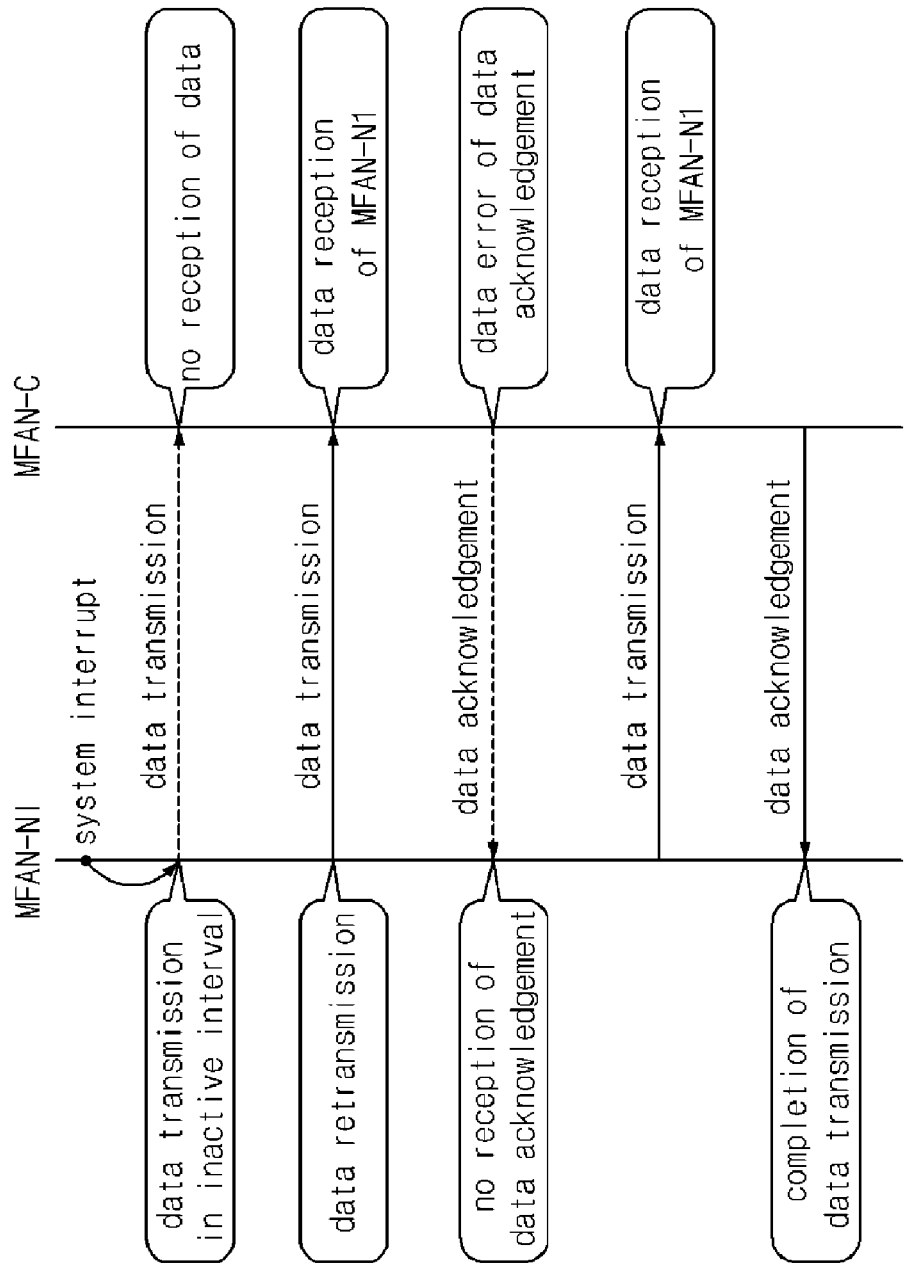
FIG. 7 is a flowchart illustrating a disassociation procedure.

FIG. 7 is a flowchart illustrating a disassociation procedure.

When a MFAN-C sends a disassociation response request packet to a MFAN-N associated with a MFAN in a request interval, the MFAN-N may send a disassociation response packet to the MFAN-C in a response interval. The MFAN-C may determine whether to disassociate the corresponding MFAN-N from the MFAN, and may provide notification of the results of the determination using a disassociation response acknowledgement packet. If the disassociation is allowed, 0xFFFE, that is, an initial node address, may be recorded in the disassociation response acknowledgement packet as a node address. In contrast, if the disassociation is rejected, the original node address may be recorded. As shown in FIG. 7, if the MFAN-C has not received the disassociation response packet or if the MFAN-C has received the disassociation response packet but the disassociating MFAN-N has not received a disassociation response acknowledgement packet due to data errors in the disassociation response acknowledgement packet, the MFAN-N may repeatedly send a disassociation response packet for every superframe until the MFAN-N receives the disassociation response acknowledgement packet. When the MFAN-N receives the disassociation response acknowledgement packet from the MFAN-C, the disassociation may be completed.

Figure 8:
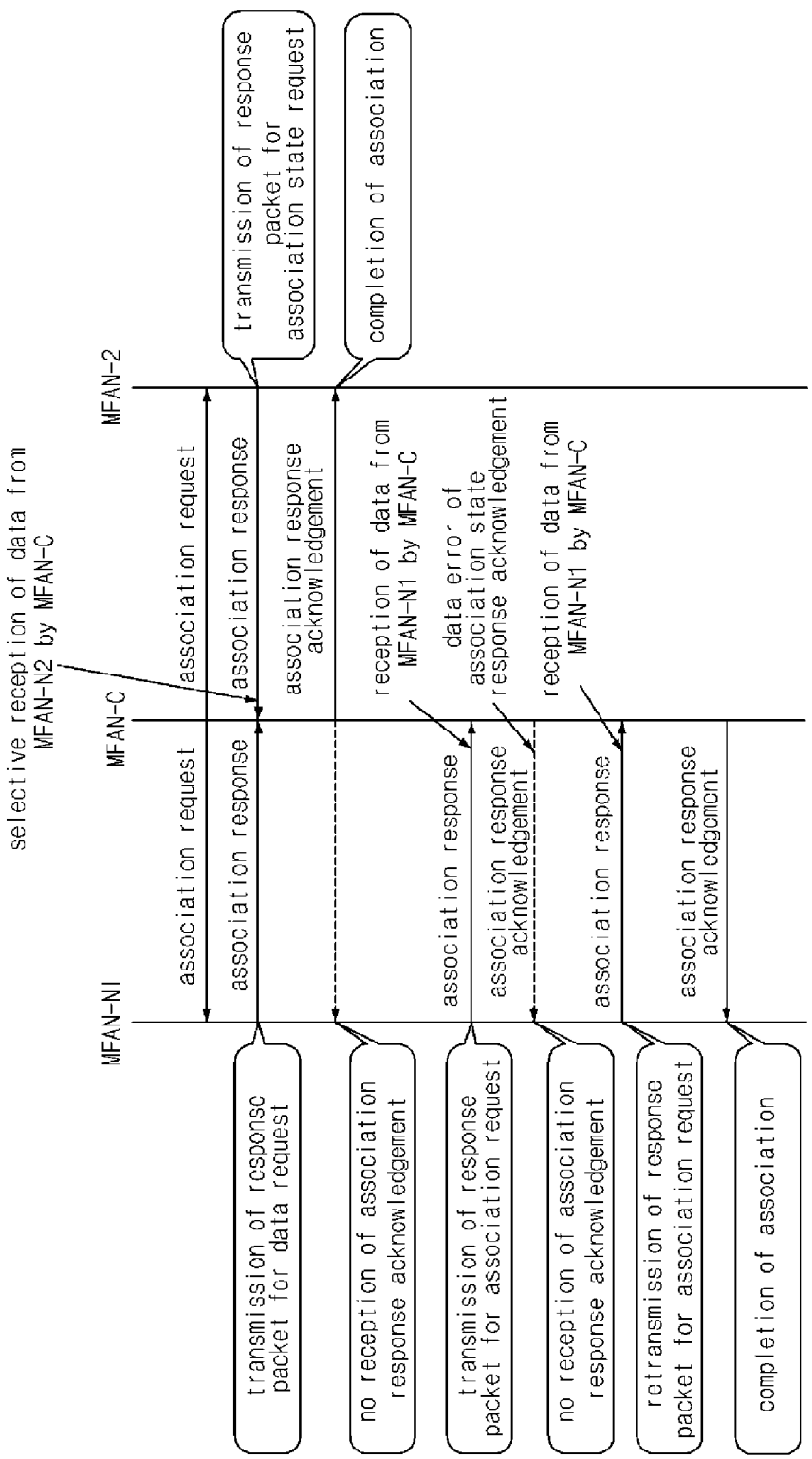
FIG. 8 is a flowchart illustrating an association state checking procedure.

FIG. 8 is a flowchart illustrating an association state checking procedure.

When a MFAN-C sends an association state response request packet to a MFAN-N associated with a MFAN in a request interval, the MFAN-N may send an association state response packet to the MFAN-C in a response interval. The MFAN-C may check the association of the corresponding MFAN-N with the MFAN, and may send an association state response acknowledgement packet. As shown in FIG. 8, if the MFAN-C has not received the association state response packet or if the MFAN-C has received the association state response packet but a MFAN-N which will send an association state response packet has not received the association state response acknowledgement packet due to the data error of the association state response acknowledgement packet, the MFAN-N may repeatedly send the association state response packet in every time slot until the MFAN-N receives the association state response acknowledgement packet. When the MFAN-N receives the association state response acknowledgement packet from the MFAN-C, an association state response may be completed.

In a MFAN, the intervals in which data can be sent may be a response interval and an inactive interval. In a response interval, data can be sent in response to a request from a MFAN-C, and in an inactive interval, data can be sent without a request from a MFAN-C.

Figure 9:
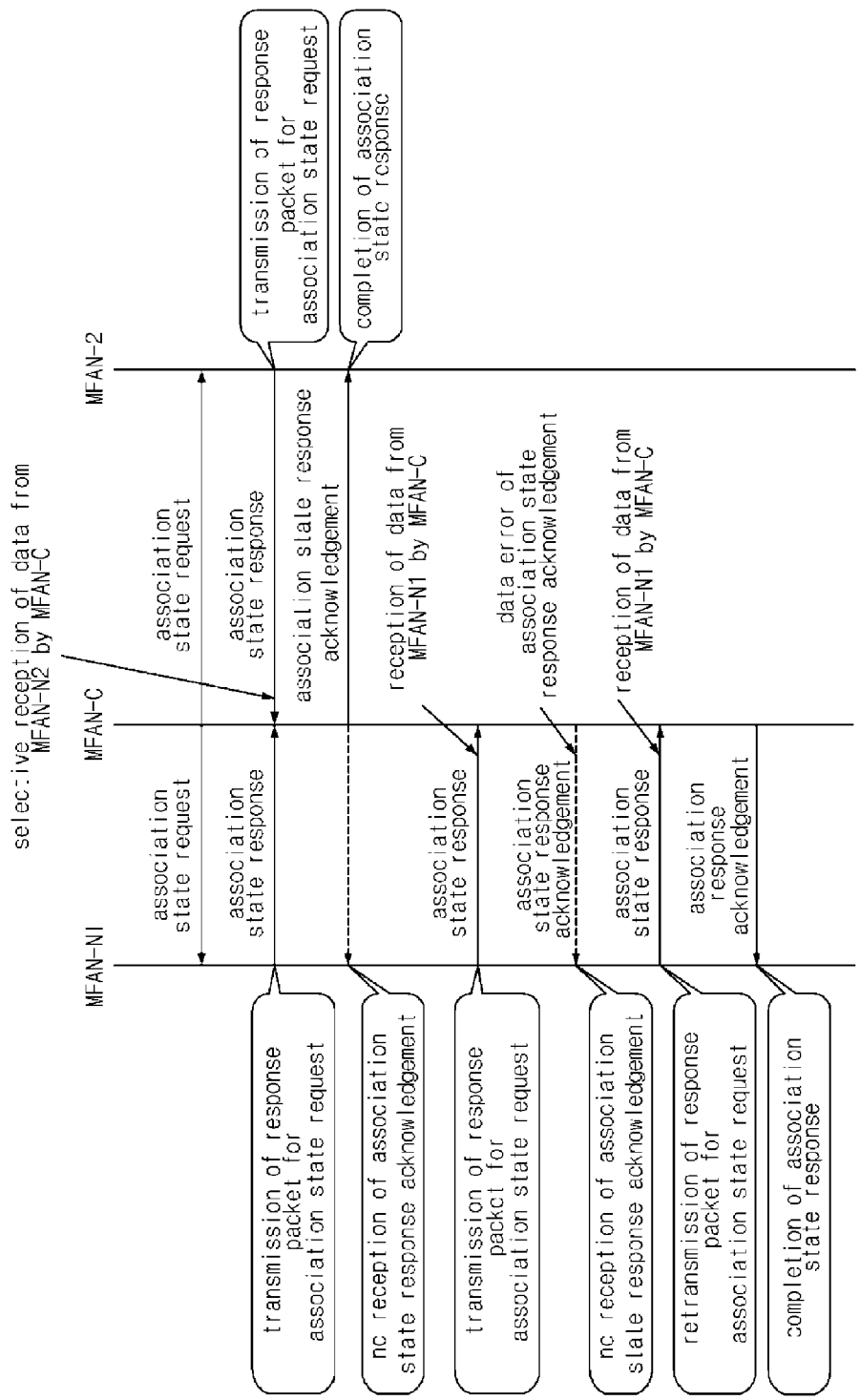
FIG. 9 is a flowchart illustrating a procedure for data transmission in a response interval.

FIG. 9 is a flowchart illustrating a procedure for data transmission in a response interval.

When a MFAN-C sends a data response request packet to a MFAN-N associated with a MFAN in a request interval, the MFAN-N may send a data response packet in a response interval. The MFAN-C may receive the data of the corresponding MFAN-N, and then may send a data acknowledgement packet. As shown in FIG. 9, if the MFAN-C has not received the data response packet or if the MFAN-C has received the data response packet but a MFAN-N which will send a data response packet has not received the data acknowledgement packet due to the data error of the data acknowledgement packet, the MFAN-N may repeatedly send the data response packet for every time slot until the MFAN-N receives the data acknowledgement packet. When the MFAN-N receives the data acknowledgement packet from the MFAN-C, the data transmission may be completed.

Figure 10:
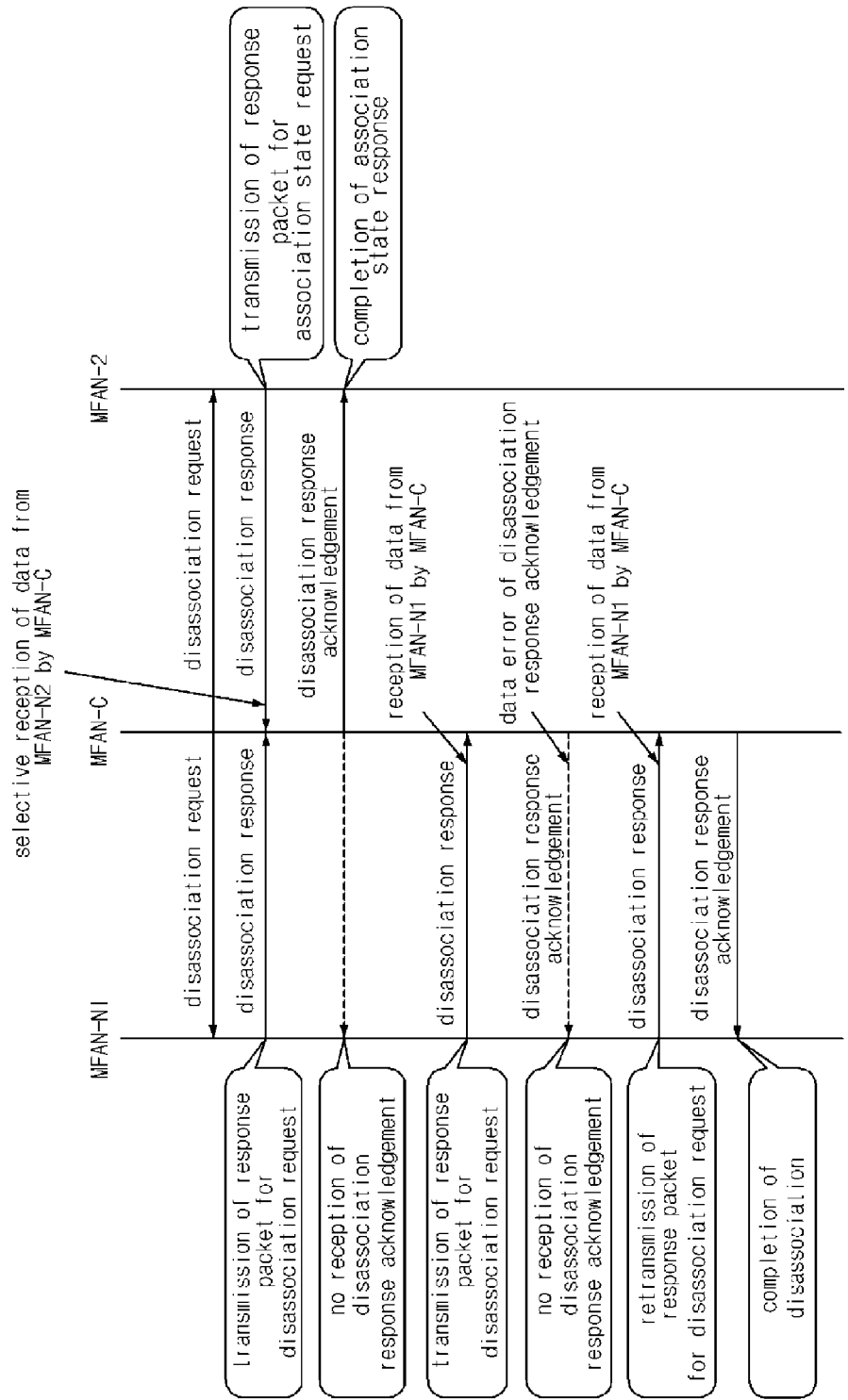
FIG. 10 is a flowchart illustrating a procedure for data transmission in an inactive interval.

FIG. 10 is a flowchart illustrating a procedure for data transmission in an inactive interval.

When a MFAN-N has not sent a response packet for a specific period of time, an inactive interval may start and last until a MFAN-C sends a request packet. Exceptionally, in this inactive interval, the MFAN-N can send data without requiring a request from the MFAN-C. As shown in FIG. 10, the MFAN-N can send data without requiring a request from the MFAN-C when a system interrupt occurs. When the MFAN-C has not received data from the MFAN-N, the MFAN-C may resend data until it receives data. When the reception of data by the MFAN-N is completed, the MFAN-C may send a data acknowledgement packet to the MFAN-N. When the MFAN-N receives a data acknowledgement packet, the data transmission may be completed.

Figure 11:
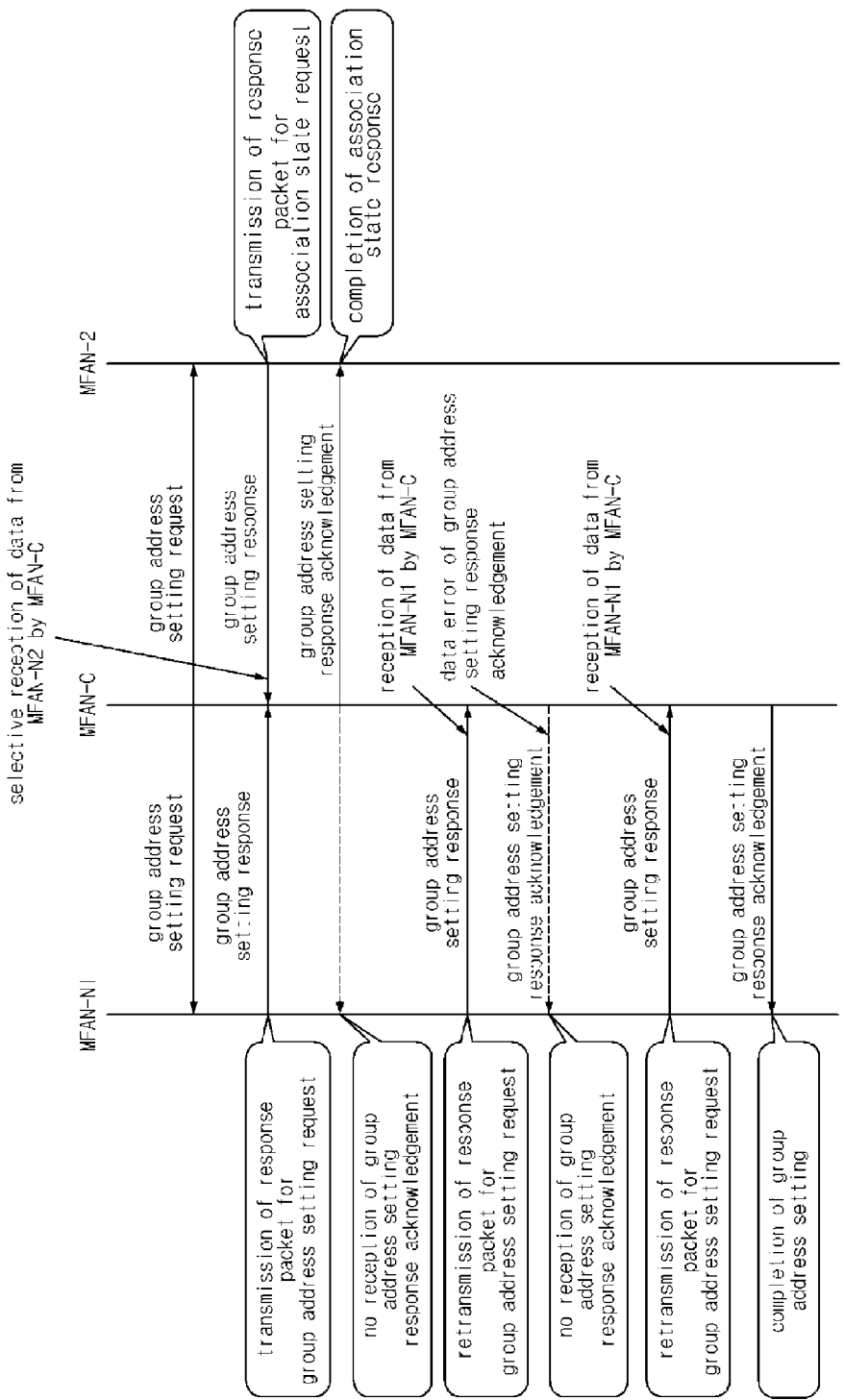
FIG. 11 is a flowchart illustrating a group address setting procedure.

FIG. 11 is a flowchart illustrating a group address setting procedure.

When a MFAN-C sends a group address setting response request packet to a MFAN-N associated with a MFAN in a request interval, the MFAN-N may send a group address setting response packet in a response interval. The MFAN-C may check the corresponding MFAN-N for a group address setting state, and then may send a group address setting response acknowledgement packet. As shown in FIG. 11, if the MFAN-C has not received the group address setting response packet or if the MFAN-C has received the group address setting response packet but a MFAN-N which will send the group address setting response packet has not received the group address setting response acknowledgement packet due to data errors in the group address setting response acknowledgement packet, the MFAN-N may repeatedly send the group address setting response packet for every time slot until the MFAN-N receives the group address setting response acknowledgement packet. When the MFAN-N receives the group address setting response acknowledgement packet from the MFAN-C, the group address setting may be completed.

Although the MFAN-C has been described as selecting MFAN-N2 from among MFAN-N1 and MFAN-N2 first and then selecting MFAN-N1 later in conjunction with FIGS. 6 to 9 and 11 above, embodiments are not limited thereto. For example, when the acknowledgement policy is "multiple acknowledgement," the MFAN-C selects MFAN-N1 and MFAN-N2 at the same time and then sends an acknowledgement packet to MFAN-N1 and MFAN-N2 at the same time.

Meanwhile, the MFAN-C may impose a limitation on the number of times a request packet is resent. Furthermore, the MFAN-N may impose a limitation on the number of times a response packet is resent.

According to the magnetic field communication method capable of recognizing multiple nodes according an embodiment, even when signals overlap with each other because a plurality of sensor nodes simultaneously responds to a coordinator, the coordinator may select a signal. Accordingly, in a magnetic field communication network, the coordinator and the plurality of sensor nodes may smoothly communicate with each other without being concerned about collisions between signals. Furthermore, as the coordinator may perform selective reception, it may recognize a plurality of sensor nodes within a short period of time.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A magnetic field communication method performed by a coordinator of a magnetic field area network, the method comprising:
   (a) sending a request packet requesting at least one of: association with the network, disassociation from the network, network association state checking, data transmission, or group address setting;
   (b) receiving response packets from nodes which have received the request packet;
   (c) selecting one or more response packets from among the response packets received at (b);
   (d) sending a response acknowledgement packet to nodes corresponding to the response packets selected at (c);
   (e) receiving response packets resent by nodes which have not received the response acknowledgement packet sent at (d);
   (f) selecting one or more response packets from among the response packets received at (e); and
   (g) sending a response acknowledgement packet to nodes corresponding to the response packets selected at (f).

2. The method of claim 1, further comprising:
   (c-1) resending the request packet to a first node, among the nodes, which sends a first response packet among the response packets received at (b) if an error occurs in the first response packet or if a destination address of the first response packet does not correspond to a node address of the coordinator,
   wherein (c-1) is repeated for a given number of times.

3. The method of claim 1, wherein (c) and (d) comprise selecting a plurality of response packets from among the response packets received at (b) and sending the response acknowledgement packet to a plurality of nodes of the network, respectively.

4. The method of claim 1, wherein (a) through (g) are performed using a frame which comprises:
   a request interval in which the coordinator sends the request packet;
   a response interval in which the nodes send the response packet; and
   an inactive interval which starts when no node of the nodes has sent a response packet in response to the request packet for a predetermined period of time.

5. The method of claim 4, wherein, during the inactive interval, the nodes are allowed to send to the coordinator packets which are not generated in response to the request packet.

6. A non-transitory computer-readable recording medium storing a program for executing the method comprising (a) through (g) set forth in claim 1.

7. The non-transitory computer-readable recording medium of claim 6, wherein the method further comprises:
   c-1) resending the request packet to a first node, among the nodes, which sends a first response packet among the response packets received at (b) if an error occurs in the first response packet or if a destination address of the first response packet does not correspond to a node address of the coordinator,
   wherein (c-1) is repeated for a given number of times.

8. The non-transitory computer-readable recording medium of claim 6, wherein (c) and (d) comprise selecting a plurality of response packets from among the response packets received at (b) and sending the response acknowledgement packet to a plurality of nodes of the network, respectively.

9. The non-transitory computer-readable recording medium of claim 6, wherein (a) through (g) are performed using a frame which comprises:
   a request interval in which the coordinator sends the request packet;
   a response interval in which the nodes send the response packets; and
   an inactive interval which starts when no node of the nodes has sent a response packet in response to the request packet for a predetermined period of time.

10. A magnetic field communication method performed by a node of a magnetic field area network, the method comprising:
    (a) receiving a request packet from a coordinator of the network;
    (b) sending to the coordinator a response packet corresponding to the request packet received at (a), for the response packet being at least one for: association with the network, disassociation from the network, network association state checking, data transmission, and group address setting; and
    (c) resending the response packet to the coordinator if an acknowledgement packet has not been received from the coordinator,
    wherein (b) and (c) are performed in a response interval of a frame comprising:
    a request interval in which the coordinator sends the request packet;
    the response interval in which the node sends the response packet; and
    an inactive interval which starts when no node has sent a response packet in response to the request packet for a predetermined period of time.

11. The method of claim 10, wherein (c) is repeated for a given number of times if the acknowledgement packet has not been received from the coordinator.

12. The method of claim 10, wherein the node is allowed to send data to the coordinator in the inactive interval without requiring reception of a request packet requesting the data from the coordinator.

13. The non-transitory computer-readable recording medium storing a program for executing the method comprising (a) through (c) set forth in claim 10,
    wherein (b) and (c) are performed in a response interval of a frame comprising:
    a request interval in which the coordinator sends the request packet;
    the response interval in which the node sends the response packet; and
    an inactive interval which starts when no node has sent a response packet in response to the request packet for a predetermined period of time.

14. The non-transitory computer-readable recording medium of claim 13, wherein (c) is repeated for a given number of times if the acknowledgement packet has not been received from the coordinator.

15. The non-transitory computer-readable recording medium of claim 13, wherein the node is allowed to send data to the coordinator in the inactive interval without requiring reception of a request packet requesting the data from the coordinator.

* * * * *